US012620272B2

(12) United States Patent (10) Patent No.: US 12,620,272 B2
Yamaguchi et al. (45) Date of Patent: May 5, 2026

(54) INFORMATION PROCESSING APPARATUS

(71) Applicant: TOYOTA JIDOSHA KABUSHIKI KAISHA, Toyota (JP)

(72) Inventors: Kenji Yamaguchi, Miyoshi (JP); Yohei Nakanishi, Nagoya (JP); Yu Hamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 298 days.

(21) Appl. No.: 18/487,633

(22) Filed: Oct. 16, 2023

(65) Prior Publication Data

US 2024/0144740 A1 May 2, 2024

(30) Foreign Application Priority Data

Oct. 27, 2022 (JP) ................................. 2022-172749

(51) Int. Cl.
*G07C 5/00* (2006.01)
*G06Q 30/0283* (2023.01)
(Continued)

(52) U.S. Cl.
CPC ......... *G07C 5/008* (2013.01); *G06Q 30/0283* (2013.01); *G06Q 30/0621* (2013.01);
(Continued)

(58) Field of Classification Search
None
See application file for complete search history.

(56) References Cited

U.S. PATENT DOCUMENTS

2012/0234471 A1* 9/2012 Guenard ................... G09F 3/10
156/182
2013/0041858 A1* 2/2013 Fujieda ................ G06N 3/0499
706/20
(Continued)

FOREIGN PATENT DOCUMENTS

JP 2003-316881 A 11/2003
JP 2007-094667 A 4/2007
(Continued)

OTHER PUBLICATIONS

Non-Final Office Action issued Jun. 2, 2025 in U.S. Appl. No. 18/504,346.
(Continued)

*Primary Examiner* — Vivek D Koppikar
*Assistant Examiner* — David Ruben Pedersen
(74) *Attorney, Agent, or Firm* — Sughrue Mion, PLLC

(57) ABSTRACT

The controller of the information processing apparatus obtains a first evaluation amount that is an evaluation amount of the first vehicle in a case that the body color of the first vehicle is assumed to be the color of the first paint coating film. The controller obtains a second evaluation amount that is an evaluation amount of the first vehicle in case that the body color of the first vehicle is assumed to be the color of the second paint coating film. The controller determines whether the second paint coating film should be removed from the first vehicle based on the first evaluation amount and the second evaluation amount. The controller outputs the above determination result.

4 Claims, 6 Drawing Sheets

(51) Int. Cl.

| | |
|---|---|
| *G06Q 30/0601* | (2023.01) |
| *G06Q 30/0645* | (2023.01) |
| *G06Q 50/43* | (2024.01) |
| *G07C 5/08* | (2006.01) |

(52) U.S. Cl.
CPC ......... *G06Q 30/0645* (2013.01); *G06Q 50/43* (2024.01); *G07C 5/08* (2013.01)

(56) References Cited

U.S. PATENT DOCUMENTS

| | | | |
|---|---|---|---|
| 2016/0117743 | A1 | 4/2016 | Joshi |
| 2021/0016553 | A1* | 1/2021 | Brei ........................ B32B 27/40 |
| 2021/0279510 | A1* | 9/2021 | Kouzaki ............... G06T 7/0004 |
| 2022/0089884 | A1* | 3/2022 | Fujioka ................... B05D 3/12 |
| 2022/0105541 | A1 | 4/2022 | Naganuma et al. |
| 2022/0138699 | A1* | 5/2022 | Graham .............. G07C 5/0808 |
| | | | 705/305 |
| 2022/0161287 | A1 | 5/2022 | Naganuma et al. |

| | | | |
|---|---|---|---|
| 2023/0162243 | A1 | 5/2023 | Southin |
| 2024/0144348 | A1 | 5/2024 | Yamaguchi et al. |
| 2024/0144740 | A1 | 5/2024 | Yamaguchi et al. |
| 2024/0161170 | A1 | 5/2024 | Yamaguchi et al. |
| 2024/0257191 | A1 | 8/2024 | Lynch et al. |

FOREIGN PATENT DOCUMENTS

| | | | |
|---|---|---|---|
| JP | 2009025155 A | * | 2/2009 |
| JP | 2022-59901 A | | 4/2022 |
| JP | 2022-083522 A | | 6/2022 |
| WO | 01/71458 A2 | | 9/2001 |

OTHER PUBLICATIONS

Non-Final Office Action issued May 30, 2025 in U.S. Appl. No. 18/495,268.

Communication dated Sep. 26, 2025 issued by the in U.S. Appl. No. 18/495,268.

\* cited by examiner

[Fig. 1]
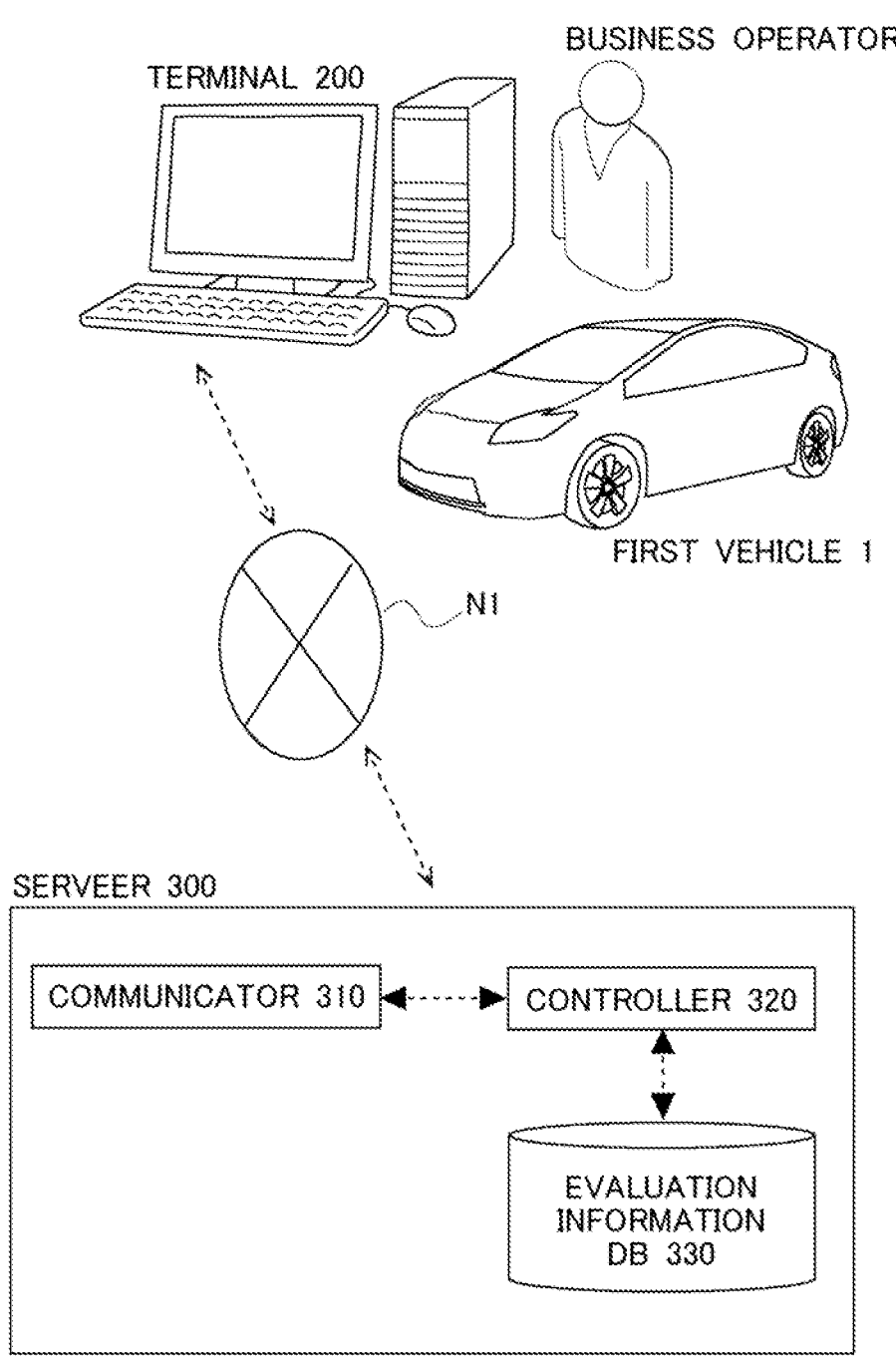

[Fig. 2]

EVALUATION INFORMATION DB  330

| VEHICLE TYPE ID | GRADE | BODY COLOR | EVALUATION AMOUNT |
|---|---|---|---|
| V0001 | ----- | C0001 | ---------- |
| V0001 | ----- | C0001 | ------------ |
| : | : | : | : |

[Fig. 3]
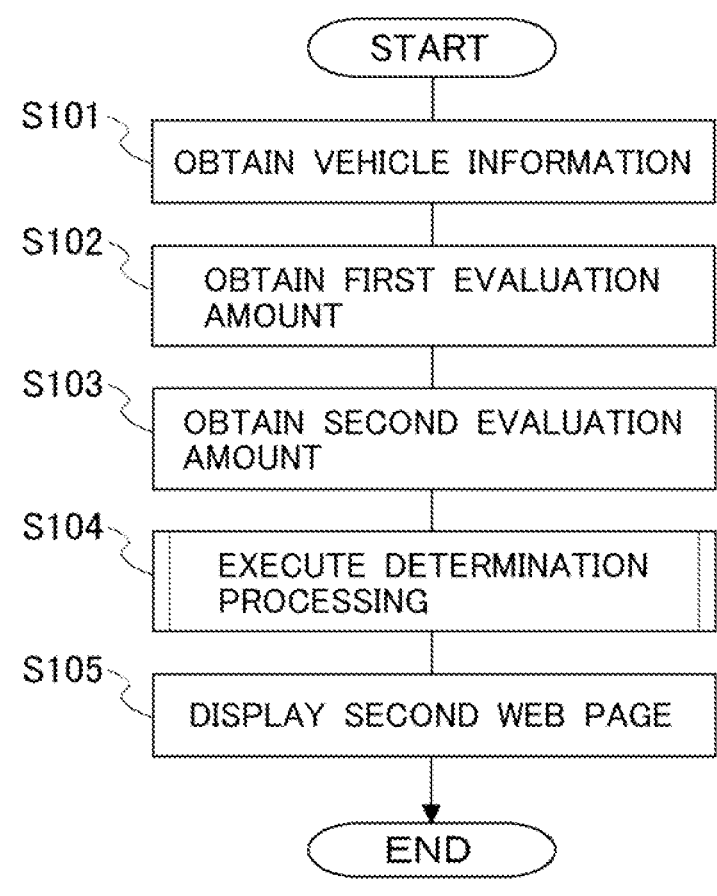

[Fig. 4]
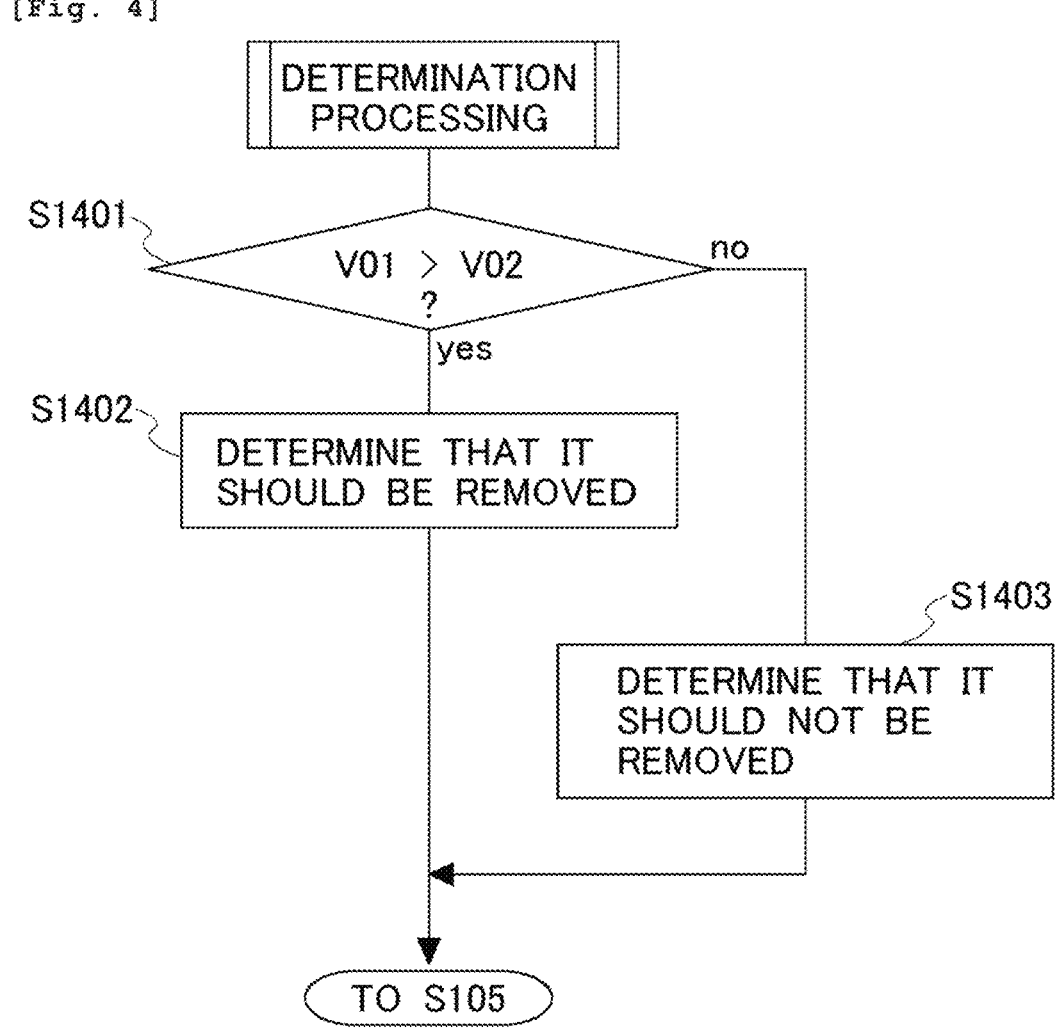

[Fig. 5]
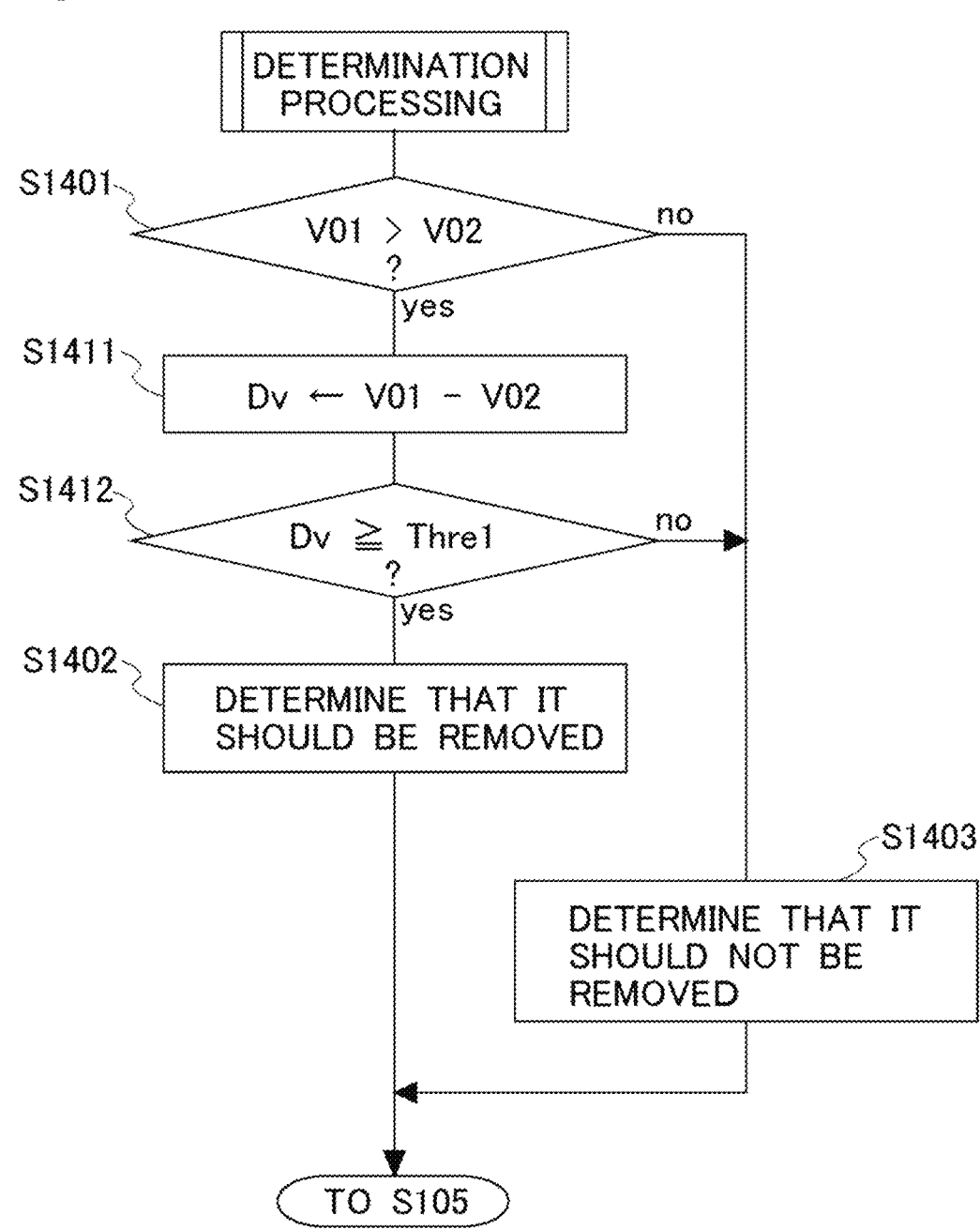

[Fig. 6]
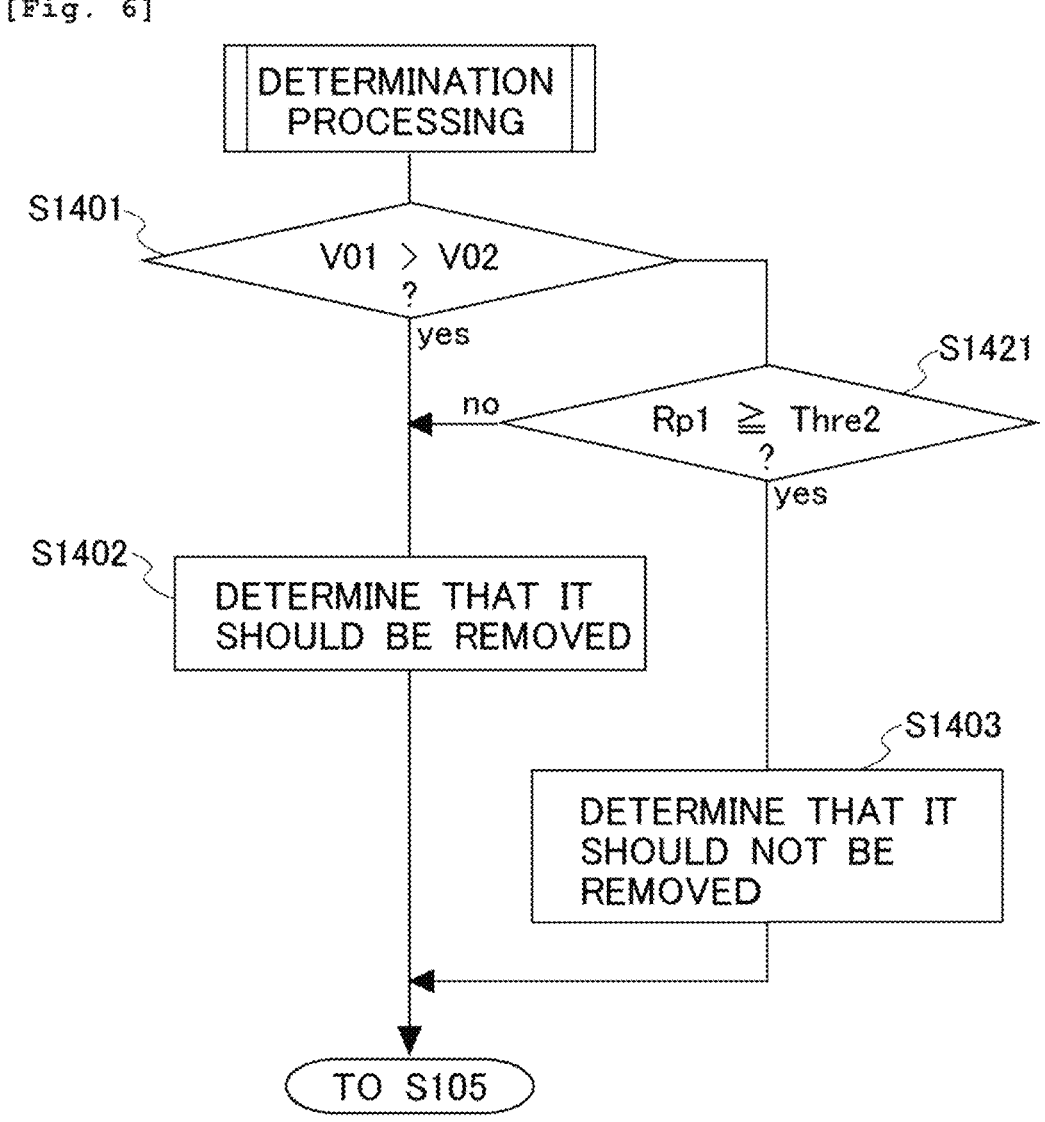

INFORMATION PROCESSING APPARATUS

CROSS REFERENCE TO THE RELATED APPLICATION

This application claims the benefit of Japanese Patent Application No. 2022-172749, filed on Oct. 27, 2022, which is hereby incorporated by reference herein in its entirety.

BACKGROUND

Technical Field

The present disclosure relates to an information processing apparatus.

Description of the Related Art

There is a known technology of applying removable coating including an easily removable layer to a vehicle (for example, see Patent Literature 1 in the citation list below).

CITATION LIST

Patent Literature

Patent Literature 1: Japanese Patent Application Laid-Open No. 2022-59901

SUMMARY

An object of the present disclosure is to provide a technology that can contribute to improving the convenience of a business operator handling a vehicle to which a paint coating film including an easily removable layer is applied.

The present disclosure can be regarded an information processing apparatus for performing processing related to a first vehicle in which a second paint coating film including an easily removable layer is overcoated on a first paint coating film. For example, the information processing apparatus may comprise a controller including at least one processor, and the controller is configured to execute processing of:

obtaining a first evaluation amount that is an evaluation amount of the first vehicle in case that a body color of the first vehicle is assumed to be a color of the first paint coating film;

obtaining a second evaluation amount that is an evaluation amount of the first vehicle in case that a body color of the first vehicle is assumed to be a color of the second paint coating film;

determining whether the second paint coating film should be removed from the first vehicle based on the first evaluation amount and the second evaluation amount; and outputting the result of the determination.

The present disclosure can also be regarded as an information processing method in which a computer executes the processing of the information processing apparatus. Further, the present disclosure can also be regarded as a program for causing a computer to execute the information processing method described above, or as a non-transitory storage medium for storing the program.

According to the present disclosure, it is possible to provide a technology that can contribute to improving the convenience of a business operator handling a vehicle to which a paint coating film including an easily removable layer is applied.

BRIEF DESCRIPTION OF THE DRAWINGS

FIG. 1 is a block diagram schematically illustrating a configuration example of a leasing system.

FIG. 2 is a diagram illustrating an example of information stored in an evaluation information DB.

FIG. 3 is a flowchart illustrating a flow of processing executed by a server according to the embodiment.

FIG. 4 is a flowchart illustrating a flow of processing performed in a determination processing according to the embodiment.

FIG. 5 is a flowchart illustrating a flow of processing performed in a determination processing according to the first modification.

FIG. 6 is a flowchart illustrating a flow of processing performed in a determination processing according to the second modification.

DESCRIPTION OF THE EMBODIMENTS

A technology for applying paint to a vehicle body using a paint coating film (a second paint coating film) including an easily removable layer has been developed. The second paint coating film is a paint coating film that can be remove afterwards, which is applied in a form of being overcoated on an original paint coating film (first paint coating film) applied to the vehicle body at the time of manufacture, etc. of the vehicle. Since the first paint coating film needs to be removed using a dedicated solvent such as a release agent, it is difficult to remove it easily. On the other hand, the second paint coating film can be easily removed without using the dedicated solvent. The second paint coating film may be one in which the paint coating film itself can be removed (easy removal g paint).

A leasing company that accepts the return of a vehicle in which the second paint coating film has been overcoated on the first paint coating film, or a used car sales company that purchases a similar vehicle, or the like, needs to determine whether the second paint coating film should be removed before next lending or selling of the vehicle. If the leasing company or used car sales company, etc. (hereinafter, may be simply referred to as "business operator") does not have detailed knowledge of the second paint coating film, it is difficult to properly make the above determination. Therefore, a technology capable of presenting an index for making the above determination to a business operator is desired.

In view of the above, a controller of an information processing apparatus according to the present disclosure obtains an evaluation amount (first evaluation amount) of the first vehicle in case that a body color of the first vehicle is assumed to be a color of the first paint coating film. Further, the controller obtains an evaluation amount (second evaluation amount) of the first vehicle in case that a body color of the first vehicle is assumed to be a color of the second paint coating film. The controller determines whether to remove the second paint coating film from the first vehicle based on the first evaluation amount and the second evaluation amount. The controller outputs the result of the determination.

The "first vehicle" referred to herein is a vehicle in which a second paint coating film including an easily removable layer is overcoated on the first paint coating film. Such a first vehicle is assumed to be, for example, a vehicle returned to the leasing company or a vehicle purchased by a used car sales company. Further, the "outputting the determination result" here means, for example, displaying a Web page on which the determination result is posted through a browser of a terminal used by the business operator, or sending an e-mail containing the determination result to the business operator's terminal.

According to the present disclosure, it is possible for a business operator to determine whether to remove the second paint coating film from the first vehicle using the determination result output by the information processing apparatus as an index. This makes it possible to properly determine whether to remove the second paint coating film from the first vehicle even in case that the business operator does not have detailed knowledge of the second paint coating film.

Hereinafter, specific embodiments of the present disclosure will be described with reference to drawings. The hardware configuration, module configuration, functional configuration, etc. described in the following embodiments are not intended to limit the technical scope of the present disclosure to those only them, unless otherwise stated.

Embodiment

An embodiments of the present disclosure will be described based on FIGS. 1-4. In the present embodiment, an example will be described in which the information processing apparatus according to the present disclosure is applied to a system that provides a vehicle leasing service (hereinafter, sometimes referred to as a "lease system").
(General Configuration of System)

FIG. 1 is a block diagram schematically illustrating an example of a configuration of a lease system according to the present embodiment. The lease system according to the present embodiment includes a terminal 200 and a server 300. Although only one terminal 200 is indicate the example illustrated in FIG. 1, multiple terminals 200 may be included in the leasing system.

The terminal 200 is a terminal used by a business operator (lease business operator) that leases a vehicle. The terminal 200 in the present embodiment is a computer on which a browser application program is installed, such as a smartphone, a mobile phone, a tablet terminal, a wearable device, or a personal computer. In the present embodiment, the lease business operator obtains a first information by accessing the server 300 through the terminal 200. As will be described later, the first information is an information that serves as an index for determining whether the second paint coating film should be removed from the first vehicle 1. The "first vehicle 1" in the present embodiment is a vehicle returned to the lease business operator at the end of the lease period. It is assumed that the first paint coating film and the second paint coating film are applied to the first vehicle 1, as will be described later.

Here, the painting applied to the first vehicle 1 will be described. An original paint coating film (a first paint coating film) is applied to the surface of the steel plate constituting the body of the first vehicle 1, and a paint coating film (a second paint coating film) is formed on the first paint coating film. The first paint coating film includes an intermediate coating layer formed on the surface of the steel sheet to which the electrodeposition layer is primed, a base layer formed on the intermediate coating layer, and a clear layer (top coat) formed on the base layer. In case where the member constituting the body of the first vehicle 1 is made of resin, a primer layer may be formed instead of an intermediate coating layer of the first paint coating film. Since the first paint coating film thus formed needs to be removed using a dedicated solvent such as a release agent, it is difficult to remove easily.

The second paint coating film includes a removable layer formed on the surface of the first paint coating film (clear layer). The removable layer is a layer of easily removable paint, and has the property that it can be easily removed off by applying a force. The removable layer is formed by painting an easily removable paint on the original paint coating film, for example, using a spraying method or the like. The easily removable paint is, for example, a paint containing xylene, ethylbenzene, an antioxidant, methylethyl ketone, a silica reactant, titanium oxide (nanoparticles), an organic solvent, and the like. The second paint coating film may be formed by including a removable layer and a clear layer formed on the surface of the removable layer.

The second paint coating film may have removability on the paint itself as described above, but a removable layer may be formed on the surface of the first paint coating film (clear layer), and a base layer and a clear layer may be formed on the surface of the removable layer. The removable layer at that time may be formed using an uncolored easily removable paint. In this case, the removable layer corresponds to the "easily removable layer" according to the present disclosure, and the paint coating film including the removable layer, the base layer, and the clear layer corresponds to the "second paint coating film" according to the present disclosure.

By using the second paint coating film described above, it becomes easy to change a body color of the first vehicle 1 to a color different from the color of the first paint coating film. It is also easy to return the body color of the first vehicle 1 to the color of the first paint coating film by removing off the second paint coating film. Therefore, when there is no color desired by the user among the color options of the first paint coating film, after selecting the first paint coating film having an appropriate color, it is possible to apply the second paint coating film having a color desired by the user and lend the first vehicle 1. However, when the first vehicle 1 is returned to the lease business operator at the end of the lease period, it is difficult for the lease business operator to properly determine whether to remove the second paint coating film from the first vehicle 1.

Therefore, in the present embodiment, the server 300 determines whether the second paint coating film should be removed based on the specifications of the first vehicle 1, and presents the determination result to the lease business operator. This makes it possible for the lease business operator to appropriately determine whether the second paint coating film should be removed from the first vehicle 1, even if the lease business operator does not have detailed knowledge of the second paint coating film.

The server 300 is an information processing apparatus operated by a business operator (service provider) that provides various services related to the vehicle to the lease business operator. The server 300 can be configured as a computer having a processor such as a CPU or GPU, a main memory such as RAM and ROM, and an auxiliary memory such as an EPROM, a hard disk drive, or removable media. An operating system (OS), various programs, various tables, and the like are stored in the auxiliary memory of the server 300. The processor of the server 300 loads the program stored in the auxiliary memory into the work area of the main memory and executes it, thereby realizing each function that matches a predetermined purpose as described later.

Note that some or all functions of the server 300 may be realized by a hardware circuit such as an ASIC (Application Specific Integrated Circuit) or an FPGA (Field Programmable Gate Array).

The server 300 according to the present embodiment is configured to enable a web server for performing an interaction with the terminal 200. By performing an interaction with the terminal 200 through the web server, the server 300 obtains an information regarding the specifications of the first vehicle 1, and presents the first information according to the obtained information to the lease business operator. The server 300 may provide the above-described service by means other than the Web server. For example, the server 300 may execute a service to interact with the terminal 200 using dedicated application software installed on the terminal 200 and a predetermined protocol.

As indicate FIG. 1, the server 300 that realizes the above-described function includes a communicator 310, a controller 320, and evaluation information DB 330.

The communicator 310 is a communication interface for connecting the server 300 to the network N1. For example, the communicator 310 connects to the network N1 via a LAN or Wi-Fi (registered trademark), and communicates with the terminal 200 via the network N1. The network N1 is, for example, a WAN which is a world-wide public communication network such as the Internet, or other communication network.

The controller 320 is a software module realized by executing a program stored in the auxiliary memory by the processor of the server 300. The controller 320 performs an interaction with the terminal 200 through execution of the web server. In the present embodiment, the controller 320 causes the browser of the terminal 200 to display a first web page for receiving input of information on the specifications of the first vehicle 1. The first web page includes the following input items.

(Input item 1) vehicle type of the first vehicle 1
(input item 2) grade of the first vehicle 1
(input item 3) color of the first paint coating film of the first vehicle 1
(input item 4) color of the second paint coating film of the first vehicle 1

When the lease business operator inputs the input items 1-4 on the first Web page, the controller 320 generates the first information. The first information is an information that serves as an index when the lease business operator determines whether the second paint coating film should be removed off from the first vehicle 1, and includes a determination result by the server 300 as to whether or not the second paint coating film should be removed off.

Here, a method in which the server 300 generates the first information will be described. The server 300 first obtains a first evaluation amount and a second evaluation amount. The first evaluation amount is an evaluation amount of the first vehicle 1 when the body color of the first vehicle 1 is assumed to be the color of the first paint coating film. The second evaluation amount is an evaluation amount of the first vehicle 1 when the body color of the first vehicle 1 is assumed to be the color of the second paint coating film.

The controller 320 obtains the first evaluation amount by accessing the evaluation information DB 330 described later using the vehicle type (input content of the input item 1) of the first vehicle 1, the grade of the first vehicle 1 (input content of the input item 2), and the color of the first paint coating film of the first vehicle 1 (input content of the input item 3) as arguments. Further, the controller 320 obtains the second evaluation amount by accessing the evaluation information DB 330 using the vehicle type of the first vehicle 1, the grade of the first vehicle 1, and the color of the second paint coating film of the first vehicle 1 (input content of the input item 4) as arguments.

The controller 320 determines whether the first evaluation amount is larger than the second evaluation amount. When the first evaluation amount is larger than the second evaluation amount, the controller 320 determines that the second paint coating film should be removed from the first vehicle 1. On the other hand, when the first evaluation amount is not larger than the second evaluation amount, the controller 320 determines that the second paint coating film should not be removed off from the first vehicle 1.

The controller 320 generates a second Web page on which the above determination result (first information) is posted. The controller 320 causes the browser of the terminal 200 to display the generated second web page.

Next, the evaluation information DB 330 will be described. The evaluation information DB 330 is an example of a "database" according to the present disclosure, and stores an evaluation amount of the first vehicle 1 for each specification of the first vehicle 1. FIG. 2 is a diagram illustrating an example of information stored in the evaluation information DB 330. The evaluation information DB 330 in the present embodiment includes a plurality of records (hereinafter, sometimes referred to as "evaluation amount records") for each specification of the first vehicle 1. As indicate FIG. 2, each evaluation amount record has each field such as a vehicle type ID, a grade, a body color, and an evaluation amount. The configuration of the evaluation amount record is not limited to the example illustrated in FIG. 2, and fields can be added, changed, and deleted as appropriate.

In the vehicle type ID field, an information (vehicle type ID) that identifies the vehicle type is registered. In the grade field, an information that individually identifies the grade set for each car model is registered. In the body color field, an information that individually identifies the body color is registered. In the evaluation amount field, an evaluation amount for each vehicle body color according to each grade of each vehicle type is registered. The information registered in the evaluation amount field is set based on an evaluation amount in the first market. For example, the vehicle type, grade, and body color may be set equal to an actual evaluation amount in the first market for the same vehicle as the first vehicle 1. In that case, the information registered in the evaluation amount field is updated as appropriate according to the market price in the first market. Note that the "first market" may be, for example, a market for a leased vehicle or a market for a used car.

(Process Executed in Server)

The flow of processing executed by the server 300 according to the present embodiment will be described with reference to FIG. 3. FIG. 3 is a flowchart illustrating a processing routine executed by the server 300 when the input of the input items 1-4 is received on the first Web page. While the processing routine according to the flow chart of FIG. 3 is executed by the processor of the server 300, functional component (the controller 320) of the server 300 will be mentioned in the following description as the components that execute the processing routine.

When the lease business operator inputs the items 1-4 while the first web page is displayed through the browser of the terminal 200, the controller 320 of the server 300 obtains a vehicle information (step S101). The "vehicle information" referred to herein is an information including the vehicle type ID of the first vehicle 1, the grade of the first vehicle 1, the color of the first paint coating film of the first vehicle 1, and the color of the second paint coating film applied to the first vehicle 1. When the process of step S101 is completed, the controller 320 executes the process of step S102.

In step S102, the controller 320 obtains the first evaluation amount of the first vehicle 1. Specifically, the controller 320 accesses the evaluation information DB 330 using the vehicle type ID, the grade, and the color of the first paint coating film included in the vehicle information obtained in step S101 as arguments, and specifies the evaluation amount record that matches the argument. At that time, the controller 320 specifies an evaluation amount record satisfying the following conditions.

(Condition 1) The information in the vehicle type ID field matches the vehicle type ID included in the vehicle information.

(Condition 2) The information of grade field matches the grade included in the vehicle information (Condition 3) The information of the body color field matches the color of the first paint coating film included in the vehicle information The controller 320 obtains the first evaluation amount by reading out the information registered in the evaluation amount field of the specified evaluation amount record. When the process of step S102 is completed, the controller 320 executes the process of step S103.

In step S103, the controller 320 obtains the second evaluation amount of the first vehicle 1. Specifically, the controller 320 accesses the evaluation information DB 330 using the vehicle type ID, the grade, and the color of the second paint coating film included in the vehicle information obtained in step S101 as arguments, and specifies the evaluation amount record that matches the argument. At that time, the controller 320 specifies an evaluation amount record satisfying the following conditions.

(Condition 4) The information in the vehicle type ID field matches the vehicle type ID included in the vehicle information.

(Condition 5) The information of grade field matches the grade included in the vehicle information (Condition 6) The information of the body color field matches the color of the second paint coating film included in the vehicle information The controller 320 obtains the second evaluation amount by reading out the information registered in the evaluation amount field of the specified evaluation amount record. When the process of step S103 is completed, the controller 320 executes the process of step S104.

In step S104, the controller 320 determines whether the second paint coating film should be removed off based on the first evaluation amount obtained in step S102 and the second evaluation amount obtained in step S103 (determination process). Here, the determination process of step S104 will be described based on FIG. 4. FIG. 4 is a flowchart illustrating the flow of the process executed by the server 300 in the determination process of step S104.

In FIG. 4, the controller 320 of the server 300 determines whether the first evaluation amount obtained in step S102 ("V01" in FIG. 4) is larger than the second evaluation amount obtained in step S103 ("V02" in FIG. 4) (step S1401). When the first evaluation amount (V01) is larger than the second evaluation amount (V02) (positive determination in step S1401), the controller 320 executes the process in step S1402. On the other hand, when the first evaluation amount (V01) is not larger than the second evaluation amount (V02) (negative determination in step S1401), the controller 320 executes the process of step S1403.

In step S1402, the controller 320 determines that the second paint coating film should be removed off. On the other hand, in step S1403, the controller 320 determines that the second paint coating film should not be removed off. When the controller 320 finishes executing the process of step S1402 or step S1403, the controller 320 executes the process of step S105 of FIG. 3.

Returning now to the description of FIG. 3. In step S105, the controller 320 generates a second web page on which the determination result (first information) of step S104 is posted. The controller 320 displays the generated second web page through the browser of the terminal 200. When the processing of step S105 is completed, the controller 320 ends the execution of the main processing routine.

(Operation and Advantageous Effects of Embodiment)

According to the embodiment described above, when the first vehicle 1 on which the first paint coating film and the second paint coating film are applied is returned to the lease business operator, the lease business operator can receive the presentation of the first information by accessing the server 300 through the terminal 200. This makes it possible for the lease business operator to determine whether the second paint coating film should be removed from the first vehicle 1 using the first information presented from the server 300 as an index. As a result, even if the lease business operator does not have detailed knowledge of the second paint coating film, it is possible for the lease business operator to appropriately determine whether to remove the second paint coating film from the first vehicle 1. Therefore, the convenience of the lease business operator can be improved.

<Modification 1>

In the embodiment described above, an example in which a determination of whether to remove off the second paint coating film is performed based on the first evaluation amount and the second evaluation amount has been described. In this modification, in addition to the first evaluation amount and the second evaluation amount, an example in which a determination is made as to whether to remove off the second paint coating film is made in consideration of the cost of removing off the second paint coating film is described.

FIG. 5 is a flowchart illustrating the flow of the process executed by the server 300 according to the present modification in step S104 (determination process) of the processing routine of FIG. 3. In FIG. 5, the same processing as in FIG. 4 is denoted by the same reference numerals, and the description thereof is omitted.

In FIG. 5, when the positive determination is made in step S1401 (V01>V02), the controller 320 executes the process of step S1411. In step S1411, the controller 320 calculates the first difference ("Dv" in FIG. 5) by subtracting the second evaluation amount (V02) from the first evaluation amount (V01). When the process of step S1411 is completed, the controller 320 executes the process of step S1412.

In step S1412, the controller 320 determines whether the first difference (Dv) is not less than the first threshold ("Thre1" in FIG. 5). The first threshold (Thre1) corresponds to the cost incurred when removing the second paint coating film from the first vehicle 1 or a value obtained by adding a margin to the above cost. When the first difference (Dv) is not less than the first threshold (Thre1) (positive determination in step S1412), the controller 320 executes the process of step S1402. On the other hand, when the first difference (Dv) is less than the first threshold (Thre1) (negative determination in step S1412), the controller 320 executes the process of step S1403.

According to the present modification, it is determined that the second paint coating film should be removed from the first vehicle 1 only when the first evaluation amount is higher than the second evaluation amount and the first difference is larger than the first threshold. As a result, it is possible to suppress the financial disadvantage of the lease business operator caused by removing the second paint coating film from the first vehicle 1.

<Modification 2>

In the above-described embodiment, an example in which a determination is made as to whether the second paint coating film should be removed off based on the first evaluation amount and the second evaluation amount has been described. In this modification, an example in which it is determined whether the second coating film should be removed off in consideration of the remaining number of years of the service life of the second coating film in addition to the first evaluation amount and the second evaluation amount will be described.

FIG. 6 is a flowchart illustrating the flow of the process executed by the server 300 according to the present modification in step S104 (determination process) of the processing routine of FIG. 3. In FIG. 6, the same processing as in FIG. 4 is denoted by the same reference numerals, and the description thereof is omitted.

In FIG. 6, when the negative determination is made in step S1401 (V01≤V02), the controller 320 executes the process in step S1421. In step S1421, the controller 320 determines whether the remaining number of years of the service life of the second paint coating film (the first number of years ("Rp1" in FIG. 6)) is not shorter than the second threshold ("Thre2" in FIG. 6). The first number of years (Rp1) is a number of years obtained by subtracting the number of years elapsed from the time when the second paint coating film is applied to the present point from the service life of the second paint coating film. The second threshold (Thre2) is, for example, the lease term length (e.g., 3 to 5 years) assuming a secondary lease.

When the first number of years (Rp1) is not shorter than the second threshold value (Thre2) (positive determination in step S1421), the controller 320 executes the process of step S1403. On the other hand, when the first number of years (Rp1) is shorter than the second threshold value (Thre2) (negative determination in step S1421), the controller 320 executes the process in step S1402.

According to the present modification, it is determined that the second paint coating film should not be removed from the first vehicle 1 only when the first evaluation amount is not larger than the second evaluation amount and the first number of years is not shorter than the second threshold value. Accordingly, it is possible to suppress a disadvantage of the secondary user (for example, the second paint coating film is removed during the lease period of the secondary lease) caused by not removing the second paint coating film from the first vehicle 1.

<Others>

The above-described embodiment is only an example, and the present disclosure may be appropriately modified and implemented within the scope of not departing from the gist. For example, in the above-described embodiment, an example of applying the information processing apparatus according to the present disclosure to a leasing system has been described, but it is also possible to apply it to a system that provides a used car sales service. In that case, when selling a used car in which the second paint coating film is overcoated on the first paint coating film, the used car business operator can appropriately determines whether should sell it without removing the second paint coating film or should sell it after removing the second paint coating film.

The processing and configuration described in the present disclosure can be freely combined as long as there is no technical contradiction. Further, the processing described as being executed by one apparatus may be executed by a plurality of apparatuses. Further, the processing described as being executed by different apparatuses may be executed by one apparatus. In a computer system, the hardware configuration that implements each function can be flexibly changed.

The technology disclosed herein can be implemented by supplying a computer program (information processing program) or programs configured to implement the functions described in the above description of the embodiments to a computer to cause one or more processors of the computer to read out and execute the program or programs. Such a computer program or programs may be supplied to the computer by a non-transitory, computer-readable storage medium that can be connected to a system bus of the computer or through a network. The non-transitory, computer-readable storage medium is a recording medium that can store information such as data and programs electrically, magnetically, optically, mechanically, or chemically in a computer-readable manner. Examples of such a recording medium include any type of discs including magnetic discs, such as a floppy disc (registered trademark) and a hard disk drive (HDD), and optical discs, such as a CD-ROM, a DVD, and a Blu-ray disc. The non-transitory, computer-readable storage medium may also be a ROM, a RAM, an EPROM, an EEPROM, a magnetic card, a flash memory, an optical card, an SSD (Solid State Drive), or other medium.

What is claimed is:

1. An information processing apparatus for performing processing related to a first vehicle in which a second paint coating film including a removable layer is configured to be removed by applying a force is overcoated on a first paint coating film, comprising a database that stores information associated with a body color and an evaluation amount, the evaluation amount being a price in a market for a lease vehicle or a price in a market for a used car, and a controller including at least one processor, wherein the controller is configured to execute processing of:

receiving, from a terminal, vehicle information of the first vehicle including a vehicle type identifier and a grade;

obtaining a first evaluation amount that is the evaluation amount of the first vehicle as the price in the market for the leased vehicle or the price in the market for the used car in case that a body color of the first vehicle is assumed to be a color of the first paint coating film by accessing the database using the vehicle type identifier, the grade, and the assumed color as arguments to identify an evaluation amount record;

obtaining a second evaluation amount that is the evaluation amount of the first vehicle as the price in the market for the leased vehicle or the price in the market for the used car in case that a body color of the first vehicle is assumed to be a color of the second paint coating film by accessing the database using the vehicle type identifier, the grade, and the assumed color as arguments to identify the evaluation amount record;

in a case where the first evaluation amount is larger than the second evaluation amount, determining to remove the second paint coating film;

in a case where the first evaluation amount is equal to or less than the second evaluation amount, obtaining a first number of years that is a remaining number of years of a service life of the second paint coating film, determining not to removed the second paint coating film when the first number of years is equal to or longer than a lease period length assuming a secondary lease, and determining to remove the second paint coating film when the first number of years is shorter than the lease period length; and generating a web page indicating a result of the determination and causing the web page to be displayed on the terminal.

2. The information processing apparatus according to claim 1, wherein in the case where the first evaluation amount is larger than the second evaluation amount, the controller is configured to execute processing of:

calculating a difference by subtracting the second evaluation amount from the first evaluation amount;

determining to remove the second paint coating film, in a case where the difference is not less than a first threshold; and determining not to remove the second paint coating film, in a case where the difference is less than the first threshold.

3. The information processing apparatus according to claim 1, wherein, before receiving, from the terminal, the vehicle information of the first vehicle including the vehicle type identifier and the grade, the controller is configured to execute processing of:

causing the terminal to display a first web page in which the vehicle type identifier and the grade are input by an operator associated with the terminal.

4. The information processing apparatus according to claim 1, wherein the controller is configured to execute processing of:

based on the result of the determination being to remove the second paint coating film, generating and displaying the web page to propose to remove the second paint coating film to an operator of the terminal and causing the operator to change the body color of the first vehicle by removing the second paint coating film from the first vehicle.

* * * * *